US012455683B2

(12) United States Patent
Jeon et al.

(10) Patent No.: US 12,455,683 B2
(45) Date of Patent: Oct. 28, 2025

(54) ELECTRONIC DEVICE, AND METHOD FOR IMPROVING MOVEMENT OPERATION OF OBJECT

(71) Applicant: Samsung Electronics Co., Ltd., Suwon-si (KR)

(72) Inventors: Jooyoung Jeon, Suwon-si (KR); Sangheon Kim, Suwon-si (KR); Taeyong Moon, Suwon-si (KR); Dongjun Lee, Suwon-si (KR); Hyesoon Jeong, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/428,566

(22) Filed: Jan. 31, 2024

(65) Prior Publication Data
US 2024/0176477 A1 May 30, 2024

Related U.S. Application Data

(63) Continuation of application No. PCT/KR2022/011874, filed on Aug. 9, 2022.

(30) Foreign Application Priority Data

Aug. 9, 2021 (KR) .......................... 10-2021-0104881

(51) Int. Cl.
*G06F 3/0486* (2013.01)
*G06F 3/01* (2006.01)
(Continued)

(52) U.S. Cl.
CPC ............ *G06F 3/0486* (2013.01); *G06F 3/016* (2013.01); *G06F 3/04817* (2013.01);
(Continued)

(58) Field of Classification Search
CPC .... G06F 3/0486; G06F 3/016; G06F 3/04817; G06F 3/0488; G06F 3/0481;
(Continued)

(56) References Cited

U.S. PATENT DOCUMENTS 10,359,907 B2   7/2019  Van Os et al.
10,628,007 B2   4/2020  Jong et al.
(Continued)

FOREIGN PATENT DOCUMENTS

JP      4717098 B2   7/2011
JP      5563676 B2   7/2014
(Continued)

OTHER PUBLICATIONS

International Search Report dated Nov. 14, 2022, issued in International Patent Application No. PCT/KR2022/011874.
(Continued)

*Primary Examiner* — Douglas Wilson
(74) *Attorney, Agent, or Firm* — Jefferson IP Law, LLP

(57) ABSTRACT

An electronic device is provided. The electronic device includes a touch screen display, memory, and one or more processors communicatively coupled to the touch screen display and the memory, wherein the memory store one or more computer programs including computer-executable instructions that, when executed by the one or more processors, cause the electronic device to detect a long press input in response to elapsing of a predetermined first touch time from a first touch for selecting an object displayed on the touch screen display, after the long press input is received, receive a drag signal indicating a move of the first touch in a certain direction, in case that the drag signal does not deviate from any of a drag movement time or a drag movement distance, maintain a selected object in a fixed state, and in case that the drag signal deviates from both the
(Continued)

predetermined drag movement time and the drag movement distance, change the object selected by the first touch to a floating state from a time point of the deviation from both the predetermined drag movement time and the drag movement distance, and perform control such that a drag movement of the floating object starts in response to the drag signal.

18 Claims, 11 Drawing Sheets

(51) Int. Cl.
  *G06F 3/0481* (2022.01)
  *G06F 3/04817* (2022.01)
  *G06F 3/0482* (2013.01)
  *G06F 3/04842* (2022.01)
  *G06F 3/0488* (2022.01)
  *G06F 3/04883* (2022.01)

(52) U.S. Cl.
  CPC .......... *G06F 3/0488* (2013.01); *G06F 3/0481* (2013.01); *G06F 3/0482* (2013.01); *G06F 3/04842* (2013.01); *G06F 3/04883* (2013.01); *G06F 2203/04803* (2013.01)

(58) Field of Classification Search
  CPC .............. G06F 3/0482; G06F 3/04842; G06F 3/04883; G06F 2203/04803
  See application file for complete search history.

(56) References Cited

U.S. PATENT DOCUMENTS

| | | |
|---|---|---|
| 10,838,612 B2 | 11/2020 | Jwa et al. |
| 2010/0265196 A1 | 10/2010 | Lee et al. |
| 2010/0313156 A1 | 12/2010 | Louch et al. |
| 2012/0084692 A1 | 4/2012 | Bae |
| 2012/0188275 A1 | 7/2012 | Shimazu et al. |
| 2013/0135228 A1 | 5/2013 | Won et al. |
| 2013/0176250 A1 | 7/2013 | Lee et al. |
| 2016/0196037 A1 | 7/2016 | Seo et al. |
| 2018/0335937 A1* | 11/2018 | Hauenstein ........... G06F 3/0482 |
| 2019/0102060 A1 | 4/2019 | Ishida |
| 2020/0387279 A1 | 12/2020 | Kim |
| 2021/0117053 A1 | 4/2021 | Karunamuni et al. |
| 2021/0342044 A1 | 11/2021 | Xu |

FOREIGN PATENT DOCUMENTS

| | | |
|---|---|---|
| JP | 6723966 B2 | 7/2020 |
| JP | 7081048 B2 | 6/2022 |
| KR | 10-0801089 B1 | 2/2008 |
| KR | 10-2009-0113622 A | 11/2009 |
| KR | 10-0950705 B1 | 3/2010 |
| KR | 10-2012-0033516 A | 4/2012 |
| KR | 10-2013-0058593 A | 6/2013 |
| KR | 10-2013-0123465 A | 11/2013 |
| KR | 10-2014-0108993 A | 9/2014 |
| KR | 10-2016-0020102 A | 2/2016 |
| KR | 10-1632114 B1 | 6/2016 |
| KR | 10-1750342 B1 | 6/2017 |
| KR | 10-1789617 B1 | 10/2017 |
| KR | 10-1850034 B1 | 4/2018 |
| KR | 10-1871751 B1 | 8/2018 |
| KR | 10-2057566 B1 | 12/2019 |
| KR | 10-2022-0043600 A | 4/2022 |
| WO | 2007/069835 A1 | 6/2007 |
| WO | WO-2016101755 A1 * | 6/2016 ........... G06F 3/0486 |

OTHER PUBLICATIONS

Extended European Search Report dated Oct. 30, 2024, issued in European Patent Application No. 22856189.0.

* cited by examiner

ELECTRONIC DEVICE, AND METHOD FOR IMPROVING MOVEMENT OPERATION OF OBJECT

CROSS-REFERENCE TO RELATED APPLICATION(S)

This application is a continuation application, claiming priority under § 365(c), of an International application No. PCT/KR2022/011874, filed on Aug. 9, 2022, which is based on and claims the benefit of a Korean patent application number 10-2021-0104881, filed on Aug. 9, 2021, in the Korean Intellectual Property Office, the disclosure of which is incorporated by reference herein in its entirety.

BACKGROUND

1. Field

The disclosure relates to an electronic device and a method for improving movement of an object.

2. Description of Related Art

An electronic device provides various functions for user convenience using various user interfaces (UIs) displayed on a touch screen display. The electronic device displays objects (e.g. app icons) for executing various functions or applications on a display (e.g. home screen). The electronic device is implemented to allow changes to the objects displayed on the display, such as movement, transition (e.g., swipe), addition, deletion, or combination.

Among them, object movement interaction may convert the object into a movement state (e.g., a floating icon) in response to an input of long pressing the object, and start the movement of the object according to a drag input.

The above information is presented as background information only to assist with an understanding of the disclosure. No determination has been made, and no assertion is made, as to whether any of the above might be applicable as prior art with regard to the disclosure.

SUMMARY

However, in the electronic device, unintentional movement of objects may occur due to ambiguous input boundaries for object selection.

For example, in the electronic device, both a popup display action of the app icon and a transition of the movement state of the app icon are activated simultaneously in response to a long press input. As a result, even when the user intends the popup display action, the app icon transitions to a movement state, and moves against the user's intention. In addition, there is a problem such as a discrepancy between the center of a touch that selects the app icon and the center of the app icon in an object movement environment, resulting in the app icon being moved to an unintended position. There is also a problem where the movement of the app icon is not accurately perceived by the user because the app icon is covered by a touch device (or touch input device).

Aspects of the disclosure are to address at least the above-mentioned problems and/or disadvantages and to provide at least the advantages described below. Accordingly, an aspect of the disclosure is to provide an electronic device and a method to improve user experience by improving the movement or drag movement of an object displayed on a display.

Additional aspects will be set forth in part in the description which follows and, in part, will be apparent from the description, or may be learned by practice of the presented embodiments.

In accordance with an aspect of the disclosure, an electronic device is provided. The electronic device includes a touch screen display, memory, and one or more processors communicatively coupled to the touch screen display and the memory, wherein the memory store one or more computer programs including computer-executable instructions that, when executed by the one or more processors, cause the electronic device to detect a long press input in response to elapsing of a predetermined first touch time from a first touch for selecting an object displayed on the touch screen display, after the long press input is received, receive a drag signal indicating a move of the first touch in a certain direction, in case that the drag signal does not deviate from any of a predetermined drag movement time or a drag movement distance, maintain a selected object in a fixed state, and in case that the drag signal deviates from both the predetermined drag movement time and the drag movement distance, change the object selected by the first touch into a floating state from a time point of the deviation from both the predetermined drag movement time and the drag movement distance, and perform control such that a drag movement of the floating object starts in response to the drag signal.

In accordance with another aspect of the disclosure, a method performed by an electronic device for improving an object movement operation of an electronic device is provided. The method includes receiving, by the electronic device, a first touch for selecting an object displayed on a touch screen display, detecting, by the electronic device, a long press input in response to elapsing of a predetermined first touch time from the first touch, after the long press input is received, receiving, by the electronic device, a drag signal indicating a move of the first touch in a certain direction, in case that the drag signal does not deviate from any of a predetermined drag movement time or a drag movement distance, maintaining, by the electronic device, the selected object in a fixed state, and in case that the drag signal deviates from both the predetermined drag movement time and the drag movement distance, changing, by the electronic device, the object selected by the first touch into a floating state from a time point of the deviation from both the predetermined drag movement time and the drag movement distance, and performing, by the electronic device, control such that a drag movement of the floating object starts in response to the drag signal.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include receiving, by the electronic device, a first touch for selecting an object displayed on a touch screen display, detecting, by the electronic device, a long press input in response to elapsing of a predetermined first touch time from the first touch, after the long press input is received, receiving, by the electronic device, a drag signal indicating a move of the first touch in a certain direction, in case that the drag signal does not deviate from any of a predetermined drag movement time or a drag movement distance, maintaining, by the electronic device, the selected object in a fixed state, and in case that the drag signal deviates from both the predetermined drag movement time and the drag movement distance, changing, by the electronic device, the object selected by the first touch into a floating state from a time point of the deviation from both the predetermined drag movement time and the drag movement distance, and performing, by the electronic device, control such that a drag movement of the floating object starts in response to the drag signal.

According to various embodiments, even when a drag signal that induces movement of an object displayed on a display is received, the object can be controlled not to move or to start moving according to a drag input by additionally determining the start point of the drag.

According to various embodiments, it is possible to solve a problem where objects move against the user's intention by improving object movement to start when a drag signal deviates from both the drag movement distance and drag movement time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
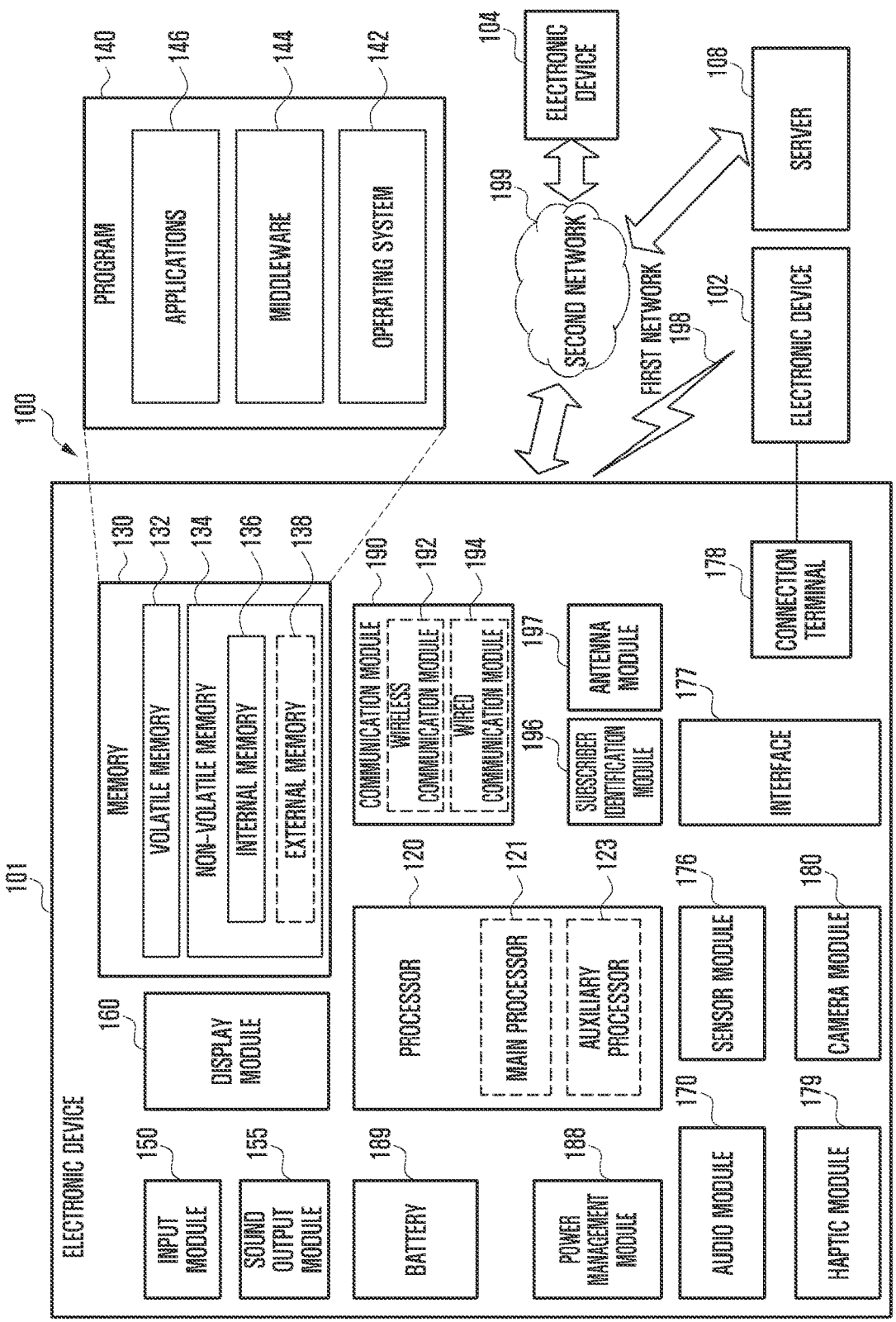
FIG. 1 is a block diagram illustrating an example electronic device 101 in a network environment 100 according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 is a block diagram illustrating an example electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and/or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory 134 may include an internal memory 136 and/or an external memory 138.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, and/or flashes.

The power management module 188 may manage power supplied to and/or used by the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, a fuel cell, or a combination thereof.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a millimeter (mm) Wave antenna module. According to an embodiment, the mmWave antenna module may include a printed circuit board, a radio frequency integrated circuit (RFIC) disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
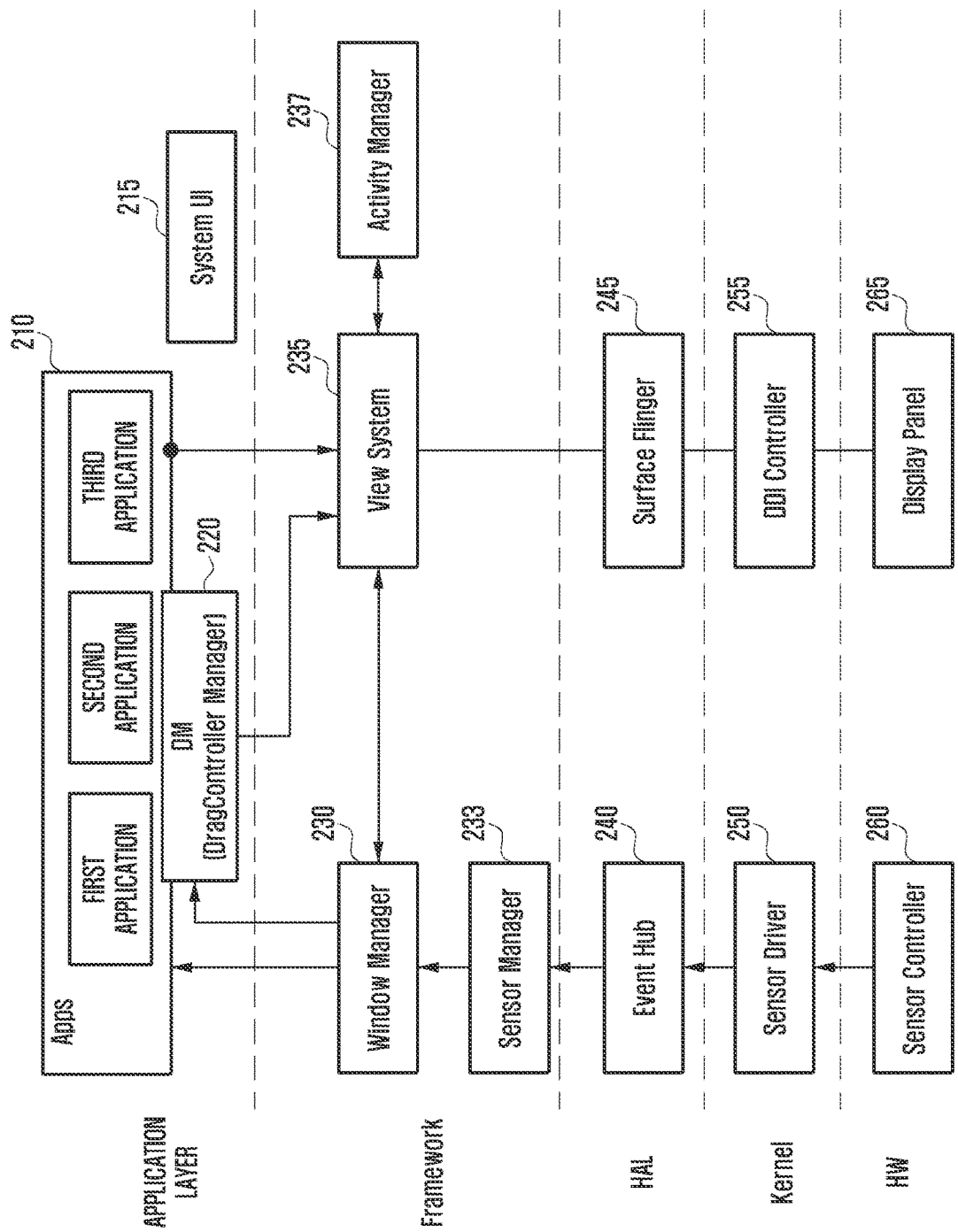
FIG. 2 illustrates a module configuration of an electronic device according to an embodiment of the disclosure.

FIG. 2 illustrates a module configuration of an electronic device according to an embodiment of the disclosure.

Referring to FIG. 2, according to various embodiments, an electronic device (e.g., the electronic device 101 of FIG. 1) may be composed of various modules. The modules described in FIG. 2 may be understood as functions performed by a processor (the processor 120 of FIG. 1) of the electronic device 101. The processor 120 may execute instructions stored in a memory (e.g., the memory 130 of FIG. 1) to implement a software module, and control hardware (e.g., the communication module 190 of FIG. 1) associated with the function.

Referring to FIG. 2, some of the modules may be implemented in hardware, and others may be implemented in software. The modules may be divided into an application layer, a framework layer, a hardware abstraction layer (HAL), a kernel driver layer, and/or a hardware (HW) layer, and at least some of the illustrated configurations may be changed.

According to an embodiment, the electronic device 101 may include at least one of an application 210, a system user interface (UI), a drag controller manager 220, a window manager 230, a sensor manager 233, a view system 235, an activity manager 237, an event hub 240, a surface flinger 245, a sensor driver 250, and a display controller 255 (e.g., display driver IC controller). The electronic device 101 may further include a sensor controller 260 and a display panel 265 in the hardware layer.

The application 210 may be the application 210 (e.g., app1, app2, or app3) that is stored on the memory of the electronic device 101, or executable or installed by the processor. Objects (e.g., app icons or widgets) corresponding to the application 210 may be displayed on a display through a view system.

The system UI 215 may manage a screen related to the system of the electronic device 101, for example, a notification bar or a quick view.

The drag controller manager 220 may be included between the application layer and the framework layer.

The drag controller manager 220 may determine whether a long press input or a drag input based on a touch signal for selecting an object (e.g., an app icon) is recognized. After receiving a first touch in an area where the object is displayed, the drag controller manager 220 may recognize the long press input by determining whether a first touch time elapses from the first touch.

After the long press input is recognized, the drag controller manager 220 may determine the starting point of the drag movement by determining whether the drag signal based on the first touch deviates from both a predetermined drag movement distance and drag movement time.

When the drag signal does not deviate from one of the predetermined drag movement distance and drag movement time, the drag controller manager 220 may maintain a fixed state or static state of the selected object. When the drag signal deviates from both the predetermined drag movement distance and drag movement time, the drag controller manager 220 may recognize the drag input and control to start the drag movement of the object in response to the drag input from the point in time when the drag signal deviates from both the conditions.

After the long press input for selecting the object is recognized, the drag controller manager 220 may transmit information about the point in time when the drag signal deviates from both the drag movement distance and drag movement time and the drag movement information to the view system. The view system may transmit graphical user interface (GUI) resources related to an icon change (e.g., movement) according to the drag input to the window manager 230. The view system 235 may include a set of extensible views used to generate the user interface of the application 210.

The window manager 230 may manage one or more GUI resources used on the screen. The window manager 230 may transmit information about the display area of the electronic device 101 to the application 210. The sensor manager 233 may control sensors based on the settings of the application 210. For example, when a user's touch input occurs, the sensor manager 233 may control the touch sensor and instruct the touch sensor to generate touch data. For example, the sensor manager 233 may instruct the touch sensor to generate touch data corresponding to a touch press (touch down or touch contact) signal, a touch drag or touch movement signal, and/or a touch up or touch cancellation signal in response to the user's touch.

The activity manager 237 may control the lifecycle and activity stack of the application 210.

The event hub 240 may be an interface module that standardizes events occurring in touch circuits and sensors. The event hub 240 may be included in a hardware abstraction layer (HAL) between a plurality of hardware modules included in the hardware layer and the software of the electronic device.

The surface flinger 245 may composite multiple layers. For example, the surface flinger 245 may provide data representing a plurality of synthesized layers to the display controller 255. Here, the display controller may refer to a graphic display controller or a display driving circuit controller.

The kernel layer may include various drivers for controlling various hardware modules included in the electronic device 101. For example, the kernel layer may include the sensor driver 250 that controls a sensor controller connected to a sensor and the display controller 255 that controls a display panel, but is not limited thereto.

The sensor driver 250 may connect the operating system and the sensor and include information about the operating method, characteristics, and/or functions of the sensor. The sensor driver 250 may include an interface module that controls the sensor controller connected to the sensor. The display controller 255 may receive data representing a plurality of layers synthesized from the surface flinger 245 and correspond to the display driving circuit.

Figure 3:
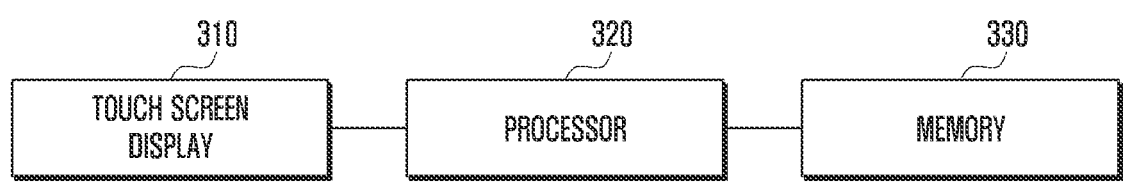
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device (e.g., the electronic device 101 of FIG. 1) may include a touch screen display 310, a processor 320, and a memory 330, and in various embodiment, further include at least some of configurations and/or functions of the electronic device 101 of FIG. 1. At least some of the shown (or not shown) components of the electronic device 101 may be operatively, functionally, and/or electrically connected to each other.

The touch screen display 310 may display various images under the control of the processor 320. The display 310 may be implemented as any one of a liquid crystal display (LCD), a light-emitting diode (LED) display, a micro LED display, a quantum dot (QD) display, or an organic light-emitting diode (OLED) display, but is not limited thereto.

According to various embodiments, at least a portion of the touch screen display 310 may be flexible, and also be implemented as a foldable display, a rollable display, a slidable display, or a stretchable display.

The touch screen display 310 may detect a touch and/or a proximity touch (or hovering) input using a user's body part (e.g., finger) or an input device (e.g., stylus pen).

The touch screen display 310 may include a touch sensor. The touch sensor may be implemented as any one of a conductivity sensor, a capacitive touch sensor, a resistive touch sensor, a surface touch sensor, a projected captivated (PCAP) touch sensor, or a surface acoustic wave touch sensor, but is not limited thereto.

The touch screen display 310 may include one or more touch sensors.

The memory 330 may include a volatile memory (e.g., the volatile memory 132 of FIG. 1) and a non-volatile memory (e.g., the non-volatile memory 134 of FIG. 1) to temporarily or permanently store a variety of data. The memory 330 may include at least some of the configurations and/or functions of the memory 130 of FIG. 1 and store the program 140 of FIG. 1.

The memory 330 may store various instructions that can be performed by the processor 320. These instructions may include control instructions such as arithmetic and logical computation, data movement, or input/output that can be recognized by the processor 320.

The processor 320 may be operatively, functionally, and/or electrically connected to each component (e.g., the touch screen display 310 and the memory 330) of the electronic device 101 to perform computation or data processing related to control and/or communication of each component. The processor 320 may include at least some of the components and/or functions of the processor 120 of FIG. 1.

There will be no limitations to the computation and data processing functions that the processor 320 can implement on the electronic device 101, but hereinafter, operations of correcting the starting point of object movement (or drag movement) of the electronic device 101 to improve a user experience environment will be described.

Operations of the processor 320, which will be described later, may be performed by loading instructions stored in the memory 340.

The processor 320 may display at least one object on the touch screen display 310. The object may be an application, a widget, or an execution icon for executing the function of the electronic device, but is not limited thereto. The object may include at least one of text, image, file, folder, or content.

For example, at least one object may be an icon (or app icon, widget) displayed on the home screen of the electronic device. The home screen may be composed of at least one layer or page.

According to some embodiments, objects displayed on the screen may have a stack structure (or list form) in which a plurality of objects are overlapped (or overlayed), and an object (or a top display object) displayed on the display through a swipe input can be converted.

For another example, the touch screen display 310 may display an app execution screen including objects.

The processor 320 may detect a touch gesture by distinguishing the touch type based on touch data. The touch data may include at least one of the touch position, touch area, touch maintenance time, movement occurrence point, touch movement time, touch movement distance, and touch movement speed. The touch gesture may be one of, for example, tap, double tap, drag, drag and drop, press (or hold and press), pinch in-out, slide, swipe, rotate, flicking, and multi touch, but is not limited thereto.

According to an embodiment, the processor 320 may recognize a touch gesture based on a first touch that selects an object (e.g., an app icon), and execute the function of the object corresponding to the touch gesture.

According to an embodiment, when a touch cancellation signal is received within a predetermined first touch time T1 after the first touch having selected the object (or object display area) is received, the processor 320 may recognize the received signal as a tap input. For example, when the tap input for the object is recognized, the processor 320 may execute an application or function corresponding to the object. The processor 320 may change the app execution screen to the foreground in response to the tap input and display the changed result.

According to an embodiment, when the first touch having selected the object is maintained for the first touch time T1, the processor 320 may recognize a long press input for an icon.

In response to the long press input, the processor 320 may display pop-up information about the selected object on the display while maintaining the selected object in a fixed state (or static state). The pop-up information of the object may refer to information guiding pop-up functions or options for checking other information about the object. The pop-up information may include at least one guidance item (e.g., app details item) that guides the use of the other information. In some cases, the guidance item may be composed of different items (e.g., widget view item, search item) depending on the characteristics of the application corresponding to the object.

According to some embodiments, the processor 320 may change a widget displayed on the screen to another widget in response to a swipe input detected within an area where the widget is displayed. For example, when a plurality of widgets have an overlapping stack structure, the processor 320 may display one widget among the plurality of widgets on the display, and change the widget displayed on the display to the other widget and display the changed result, in response to the detection of a swipe input (e.g., touch cancellation after touch movement) within the widget. Here, a touch movement distance for detecting the swipe input may be relatively shorter than a drag movement distance D1.

According to an embodiment, after the long press touch is recognized, the processor 320 may continuously receive a drag signal that causes the first touch to move in one direction. The processor 320 may cancel display of pop-up information in response to a touch cancellation received after the drag signal or long press touch is recognized.

The processor 320 may maintain the object in a fixed state (static state) even when the drag signal is received after the long press touch input is recognized.

The processor 320 may determine the starting point of the drag movement of the object based on a drag movement time T2 and the drag movement distance D1 of the drag signal.

For example, the processor 320 may determine whether the drag signal satisfies a condition of deviating from the predetermined drag movement time T1 from the start of the drag signal and a condition of deviating from a first position where the drag signal is started to a second position separated by the predetermined the drag movement distance D1, recognize the drag signal as a drag input from the point when the drag signal deviates from the drag movement time T1 and the drag movement distance D1, and control to start a drag movement operation (or movement operation) of the object. The drag movement time and drag movement distance may mean a reference value for recognizing that the user has a dragging intention.

The processor 320 may control the selected object to be converted into a floating state from the start of the drag movement and to start a floating object movement (i.e., the drag movement operation) in response to the drag input. For example, the processor 320 may identify the movement direction and movement position of the object corresponding to the drag input, and move the object. For example, by dragging the object, the user may perform change functions such as changing the position of the object, generating a folder related to the object, or changing the object's page.

According to an embodiment, the processor 320 may detect the touch cancellation signal in response to the drag signal, drop the floating object to a position where the touch was cancelled, change the floating object to a fixed state, and display the changed result.

According to an embodiment, the processor 320 may identify the size of an area where the touch occurs, adjust the size of the object in proportion to the size of the area where the touch occurs, and display the adjusted object. When the drag movement of the floating object starts, the processor 320 may control the floating object to be converted to the floating object of the adjusted size and start the drag movement. For example, when the touch signal is received, the processor 320 may identify the size of the area where the touch occurs, generate data for adjusting the size of the object, and control the object at the time of drag movement of the floating object to be changed into the floating object with the adjusted size so that the movement is started.

According to an embodiment, the processor 320 may reconfigure and display the position of the floating object. For example, the processor 320 may adjust the position of the floating object so that the floating object is moved while the center point of the floating object matches the coordinates of a touch center of the drag signal.

According to an embodiment, the processor 320 may identify the speed of the drag signal, and adjust the data processing time (e.g., reordering duration) of the animation effect according to the movement of the floating object to be variable in response to the drag speed.

According to an embodiment, the processor 320 may dynamically reconfigure the drag movement distance and drag movement time based on one of user-specific information analyzed based on the usage history of the electronic device and sensor information.

For example, the processor 320 may accumulate user's personal touch data and user characteristic information and store the accumulated information in the memory 330. The processor 320 may analyze the touch data and the user characteristic information to generate personal behavior pattern information related to a change in the object. For example, after selecting the object, the processor 320 may analyze a difference between a drag for changing the position of the object and a drag for changing a page or a drag for generating a folder, and determine and reconfigure the drag movement distance and the drag movement time based on personal behavior pattern information.

The processor 320 may generate a personalization algorithm using an artificial intelligence (AI) model. The AI model may be generated through machine learning. This learning may be performed in the electronic device 101 itself where the AI model is performed or may be performed through a separate server. The learning algorithm may include, for example, at least one of supervised learning, unsupervised learning, semi-supervised learning, and reinforcement learning, but is not limited the above-described examples. According to various embodiments, the AI model may include a plurality of artificial neural network layers. An artificial neural network may include a deep neural network, a feedforward neural network (FNN), convolutional neural network (CNN), a recurrent neural network (RNN), a restricted Boltzmann machine (RBM), a deep belief network (DBN), a bidirectional recurrent deep neural network (BRDNN), and a deep Q-network, or a combination of two or more of the above-described networks, but is not limited to the above examples. In addition to hardware structures, the AI model may additionally or alternatively include software structures.

According to various embodiments, the electronic device may keep the object from being immediately changed to the movement state by the long press input, and further identify whether the drag signal of the touch for which the long press input is recognized deviates from both the drag movement time and the drag movement distance, thereby determining whether the user's intention is for the drag input to prevent the object from moving against the user's intention.

The electronic device 101 according to various embodiments may include a touch screen display (e.g., the display module 160 of FIG. 1 or the touch screen display 310 of FIG. 3), a memory (e.g., the memory 130 of FIG. 1 or the memory 330 of FIG. 3), and a processor (e.g., the processor 120 of FIG. 1 or the processor 320 of FIG. 3) configured to be connected to the touch screen display and the memory, wherein the processor may detect a long press input in response to elapsing of a predetermined first touch time T1 from a first touch for selecting an object displayed on the touch screen display; after the long press input is received, receive a drag signal indicating moving of the first touch in a certain direction; when the drag signal does not deviate from any of a predetermined drag movement time T2 or a drag movement distance D1, maintain the selected object in a fixed state; when the drag signal deviates from both the drag movement time T2 and the drag movement distance D1, change the object selected by the first touch into a floating state from a time point of the deviation from both the drag movement time T2 and the drag movement distance D1; and perform control such that a drag movement of the floating objects starts in response to the drag signal.

According to various embodiments, in response to reception of a touch cancellation signal of the drag signal, the processor 120 or 320 may control the floating object moved to a position where the touch cancellation signal is received to be dropped and changed to a fixed state.

According to various embodiments, the object may include at least one of an app icon, a widget, an image, content, text, a file, and a folder.

According to various embodiments, the processor 120 or 320 may display pop-up information of the selected object in response to detection of the long press input, and control the display of the displayed pop-up information to be cancelled in response to reception of the drag signal.

According to various embodiments, the pop-up information of the object may be a pop-up window including items guiding a pop-up function or option for identifying other information about the selected object.

According to various embodiments, the processor 120 or 320 may control a vibration effect notifying the start of the drag to be output at the time of starting of the drag movement of the floating object.

According to various embodiments, the drag movement distance and the drag movement time may be dynamically adjusted based on one of user-specific information analyzed based on the usage history of the electronic device and sensor information.

According to various embodiments, the processor 120 or 320 may identify the size of an area where the first touch occurs, adjust the size of the selected object in proportion to the identified size, and control the selected object to be displayed as the adjusted object.

According to various embodiments, the processor 120 or 320 may control the floating object to be displayed as the floating object with the adjusted size at the time of starting of the drag movement of the floating object.

According to various embodiments, the processor 120 or 320 may identify the center point of an area where the floating object is displayed, and adjust the position of the floating object so that the floating object is moved while the center point of the floating object matches coordinates of a touch center of the drag signal.

According to various embodiments, the processor 120 or 320 may identify the speed of the drag signal, and control the data processing time of an animation effect according to the movement of the floating object to be variable in response to the drag speed.

Figure 4:
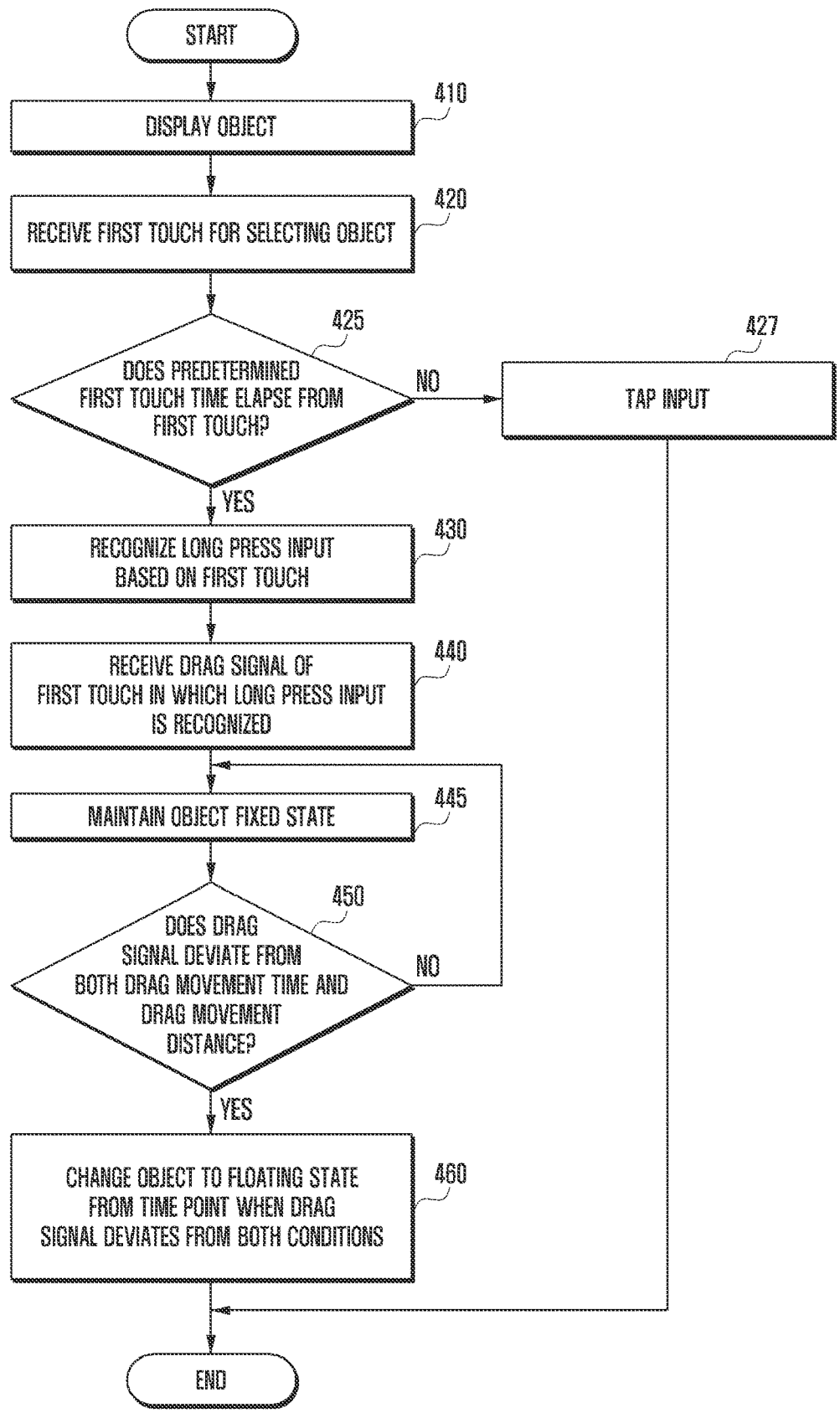
FIG. 4 illustrates a method of improving a movement operation of an object of an electronic device according to an embodiment of the disclosure.
Figure 5A:
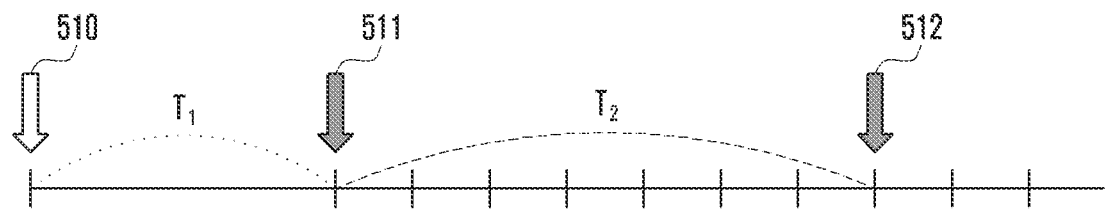
FIGS. 5A and 5B illustrate examples for explaining an object movement start condition according to various embodiments of the disclosure.
Figure 5B:
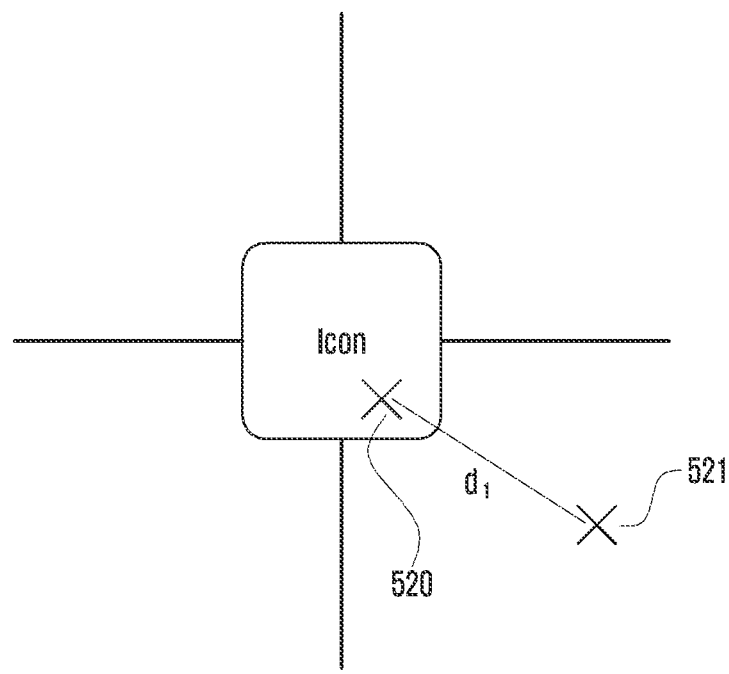

FIG. 4 illustrates a method of improving a movement operation of an object of an electronic device according to an embodiment of the disclosure, and FIGS. 5A and 5B illustrate examples for explaining an object movement start condition according to various embodiments of the disclosure.

Referring to FIGS. 4, 5A, and 5B, in operation 410, the processor (e.g., the processor 320 of FIG. 3) of the electronic device 101 according to an embodiment may display at least one object (e.g., icon) on a touch screen display (e.g., the touch screen display 310 of FIG. 3).

For example, the processor 320 may display an object (e.g., icon) corresponding to an application on a home screen. The object may be an application, a widget, or an execution icon for executing the function of the electronic device, but is not limited thereto.

In operation 420, the processor 320 may receive a first touch for selecting the object.

The processor 320 may identify a first touch point (e.g., first touch coordinates) based on touch data received through the touch screen display, and select an object corresponding to the touch point. The touch point may be generated with two-dimensional or three-dimensional coordinate information.

The processor 320 may recognize a touch gesture by distinguishing the touch type based on touch data (e.g., touch time, whether movement occurs, touch distance, touch movement speed).

In operation 425, the processor 320 may identify whether a predetermined first touch time T1 elapses after the first touch.

When a touch cancellation occurs within the first touch time T1 after the first touch, the processor 320 may proceed to operation 427 and detect a tap input for the object.

In operation 430, when the first touch time T1 elapses after the first touch having selected the object, the processor 320 may recognize (or detect) a long press input (or touch gesture) based on the first touch.

In operation 440, after the long press input (or touch gesture) is recognized, the processor 320 may continuously receive a drag signal (or movement signal) of the first touch.

For example, the processor 320 may receive the drag signal that moves in any direction depending on the position of the first touch maintained after the long press input is recognized.

In operation 445, the processor 320 may maintain a fixed state or a static state of the object even if the drag signal of the first touch for which the long press input is recognized is received.

Operations 440 and 445 may be performed in parallel or simultaneously, and the order of operations 440 and 445 may be changed. For example, the processor 320 may maintain the fixed state of the object even if the long press input is recognized.

In operation 450, the processor 320 may determine whether the drag signal of the first touch from which the long press input is recognized deviates from both a predetermined drag movement time T2 and a drag movement distance D1.

For example, the processor 320 may determine whether the drag signal of the moving first touch is maintained for a drag movement time T2 (or drag duration) from a point in time (a first time point) when the long press input is recognized while fixing/holding the selected object.

For example, referring to FIG. 5A, in the electronic device 101, the touch time T1 configured to recognize the long press input and the drag movement time T2 for determining the start point of the drag movement of the object may be configured in advance. The processor 320 may receive the first touch having selected the object at a first time point 510, and recognize the long press input selecting the object when the first touch started from the first time point 510 has passed a second time point 511 based on timer information.

After the long press input is recognized, the processor 320 may receive the drag signal of the moving touch. The processor 320 may determine whether the drag signal in which the touch moves in one direction is maintained from the second time point 511 to a third time point 512. Even if the drag signal is received, the processor 320 may maintain the fixed state of the object so that the selected object does not move from the second time point 511 to the third time point 512.

Substantially simultaneously or in parallel, the processor 320 may determine whether the drag signal of the first touch that moves after the recognition of the long press input is moved from a first position (e.g., the position where the first touch started, initial touch position) to a second position separated by a drag movement distance D1 (or drag duration).

For example, referring to FIG. 5B, in the electronic device 101, the drag movement distance D1 for determining the start point of the drag movement of the object is configured in advance. The processor 320 may determine whether the drag signal is maintained to a second position 521 separated by a distance through which the radius of a predetermined drag movement distance passes after the first touch starts in a first position 520 (or first touch start position or initial touch position) within an object area.

Even if the drag signal is received, the processor 320 may maintain the fixed state of the object so that the selected object does not move from the first position 520 to the second position 521.

In operation 460, when the drag signal of the first touch deviates from both a drag movement time T2 and a drag movement distance D1, the processor 320 may change the object into a floating state from a time point when the drag signal deviates from the two conditions, and start the drag movement of the floating object according to a drag input.

When the drag signal does not satisfy either the drag movement time T2 or the drag movement distance D1, the processor 320 may maintain the fixed state of the selected object.

According to an embodiment, when changing the object into the floating state, the processor 320 may output a vibration effect to guide the user about the movement of the object.

The processor 320 may identify the movement direction and movement position of the floating object based on the drag input, and move the object. For example, by dragging the object, the user may perform functions such as changing the position of the object, generating a folder of the object, or changing a page for the object.

According to an embodiment, the processor 320 may identify the size of an area where the first touch occurs and adjust the size of the selected object according to the size of the area where the touch occurs. The processor 320 may change the floating object to the floating object with the adjusted size at the time of starting of the drag movement of the floating object, and start an object drag movement.

According to an embodiment, the processor 320 may reconfigure (or adjust) the position of the floating object so that the touch point matches the center point of the floating object, and display the reconfigured position of the floating object. The processor 320 may control the floating object to move along the center coordinates of the area where the touch occurs when the floating object starts to move.

Figure 6:
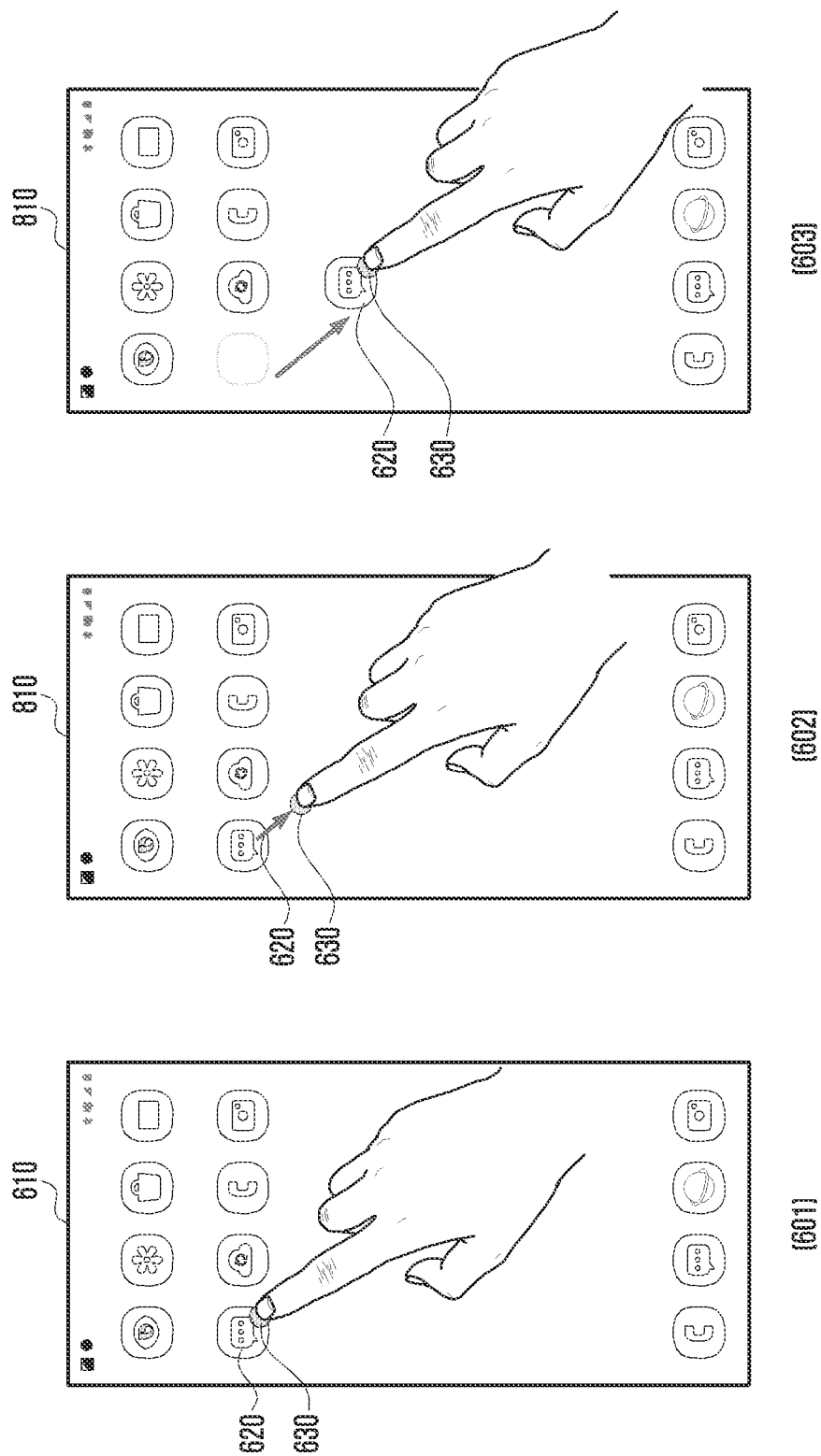
FIG. 6 illustrates a user interface screen showing an object movement operation of an electronic device according to an embodiment of the disclosure.

FIG. 6 illustrates a user interface screen showing an object movement operation of an electronic device according to an embodiment of the disclosure.

Referring to FIG. 6, according to an embodiment, a display (e.g., the touch screen display 310 of FIG. 3) of the electronic device 101 may display a home screen 610 including a plurality of app icons as shown in screen 601.

The user may touch a message app icon 620, and maintain the touch for a predetermined time. The processor (e.g., the processor 320 of FIG. 3) may receive a first touch 630 for selecting the message app icon 620, and recognize a long press input at a time point when a first touch time T1 elapses from the first touch 630.

According to some embodiments, the processor 320 may maintain the messaging app icon 620 in the fixed state in response to the long press input, but display a visual effect (e.g., border highlighting) to indicate that the object is selected.

The user may drag a long press for the message app icon while maintaining the long press.

After the long press input is detected, the processor 320 may or may not start the drag movement of the icon depending on whether the received drag signal deviates from two conditions of a drag movement distance and a drag movement time.

As shown in screen 602, the user may maintain a first touch 630 for selecting the message app icon 620 for a predetermined time, and then drag the first touch 630 to a position outside the message app icon.

When the drag signal does not deviate from any of the two conditions of the drag movement distance T2 and the drag movement time D1 even though the drag signal (or touch movement) of the user is received, the processor 320 may determine that the user does not intend to move the icon, and maintain the icon in a fixed state, thereby preventing unnecessary and unintentional movement of the icon.

As shown in screen 603, when the drag signal of the user deviates from the two conditions of the drag movement distance T1 and the drag movement time D1, the processor 320 may determine that the user intends to move the icon and start an icon drag movement. When the drag signal deviates from the two conditions, the processor 320 may change the message app icon 620 into a floating state, and move and display the message app icon 620 to a position where the touch signal is currently received.

Figure 7:
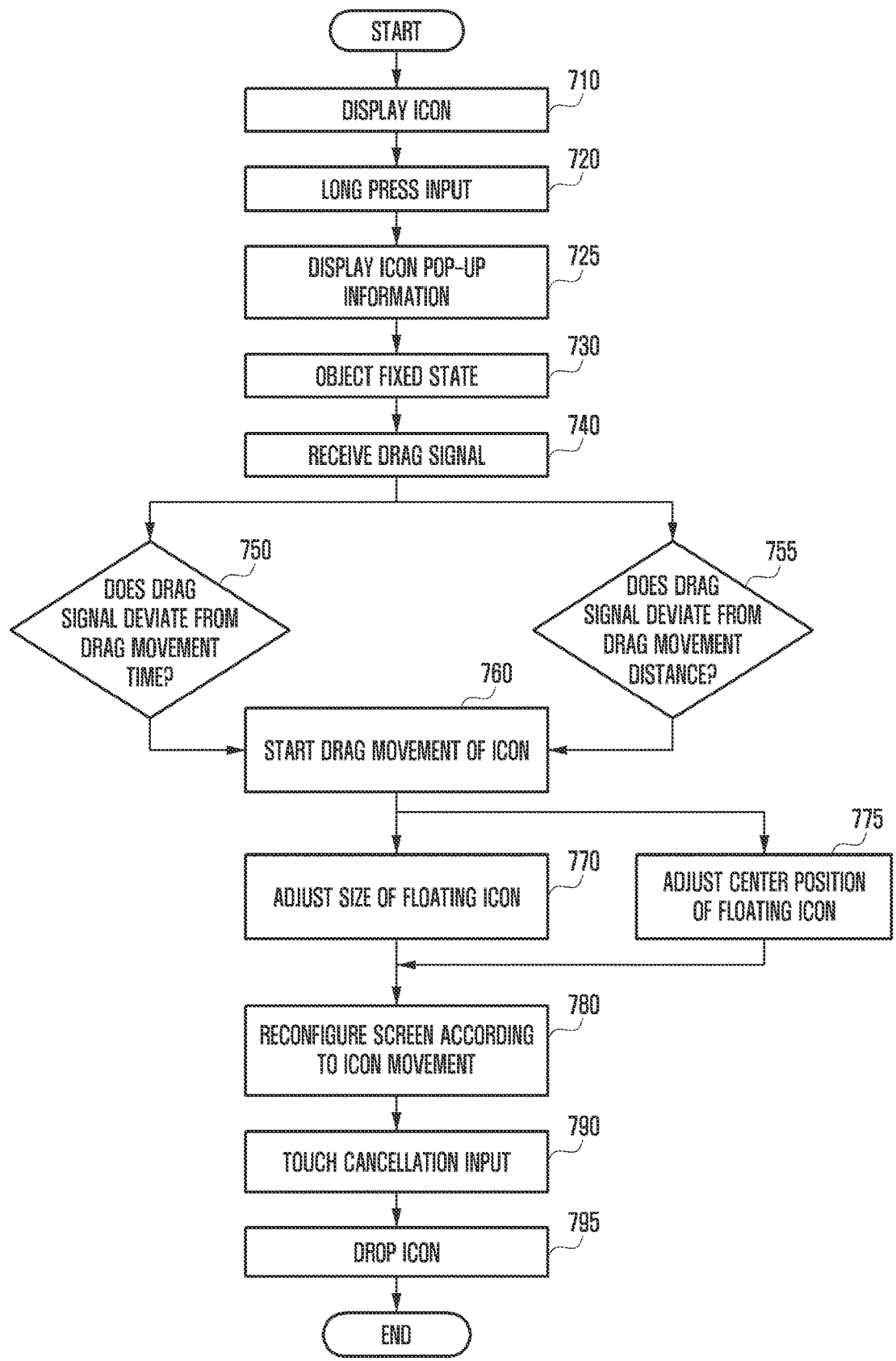
FIG. 7 illustrates a method of improving a movement operation of an object of an electronic device according to an embodiment of the disclosure.

FIG. 7 illustrates a method of improving a movement operation of an object of an electronic device according to an embodiment of the disclosure.

Referring to FIG. 7, in operation 710, a processor (e.g., the processor 320 of FIG. 3) of the electronic device 101 may display at least one icon (or object) on a touch screen display (e.g., the touch screen display 310 of FIG. 3). According to some embodiments, the icon may be replaced with a widget, an image, or content.

For example, the processor 320 may display a home screen including icons corresponding to applications. The icon may be an execution icon for executing an application, a widget, or the function of the electronic device, but is not limited thereto.

In operation 720, the processor 320 may detect (or recognize) a long press input (or touch gesture) based on a first touch for selecting the icon.

The processor 320 may identify a first touch point (e.g., first touch coordinates) based on touch data received through the touch screen display, and select an icon corresponding to the touch point. The processor 320 may recognize (or detect) the long press input (or touch gesture) based on elapsing of a first touch time T1 by the first touch for selecting the icon.

In operation 725, the processor 320 may display pop-up information about the selected icon in response to the long press input for selecting the icon.

The pop-up information of the icon may refer to a pop-up function for identifying other information of the icon or information that guides pop-up options. The pop-up information may include at least one guidance item (e.g., app details item) that guides the use of other information. In some cases, the guidance items may be composed of different items (e.g., widget view item, search item) depending on the characteristics (or object characteristics) of the application corresponding to the icon.

In operation 730, the processor 320 may maintain a fixed state (static state) of the icon.

For example, the processor 320 may maintain the fixed state of the icon independently of displaying the pop-up information of the icon.

In operation 740, the processor 320 may continuously receive the drag signal (or movement signal) of the first touch after the long press input is recognized.

For example, the processor 320 may receive the drag signal in which the first touch maintained after the recognition of the long press input moves in any direction.

According to an embodiment, the processor 320 may cancel the display of the pop-up information in response to the reception of the drag signal in which the first touch continuously moves in one direction while the pop-up information of the icon is displayed, or a touch cancellation.

According to some embodiments, the order of operations 730 and 740 may be changed.

Although not shown in the drawing, the processor 320 may receive a swipe input detected within an area where a widget is displayed, and change the object displayed on the screen into another object in response to the swipe input. For example, when the home screen is configured as a stack structure where a plurality of objects overlap, the processor 320 may display one object among the plurality of objects on the display, change the object displayed on the screen to another widget in response to the detection of the swipe input (i.e., touch cancellation after touch movement) within the object, and display the changed result. Here, a touch movement distance for detecting the swipe input may be relatively shorter than the drag movement distance D1.

In operation 750, the processor 320 may determine whether the drag signal of the first touch deviates from a predetermined drag movement time T2 (or drag duration) from the point in time (e.g., first time point) when the long press input is recognized after the selected icon is fixed/held.

When the drag signal based on the first signal does not pass the drag movement time T2 (or touch duration), the processor 320 may maintain the fixed state of the icon.

Substantially simultaneously or in parallel, in operation 755, the processor 320 may determine whether the drag signal of the first touch moved after the long press input is recognized deviates from a second position separated from a first position (e.g., position where the first touch started or initial touch position) by the drag movement distance D1 (or drag duration).

When the drag signal of the first touch does not move by the drag movement distance D1, the processor 320 may maintain the fixed state of the icon.

In operation 760, when the drag signal of the first touch deviates from both the drag movement time T2 and the drag movement distance D1, the processor 320 may change the icon into a floating state from the point in time when the drag signal deviates from both the conditions, and start the drag movement of the floating icon depending on a drag input.

In operation 770, the processor 320 may identify the size of an area where the first touch occurs, and adjust the size of the icon selected according to the size of the area where the touch occurs. At the time of starting of drag movement of the floating icon, the processor 320 may change the floating icon to the floating icon with the adjusted size to start the drag movement of the icon.

According to an embodiment, the processor 320 may identify the size of the area where the touch occurs according to the degree of an angle (e.g., finger pitch) between a touch input tool and the touch screen display or the degree of left and right rotation of the touch input tool (e.g., finger roll) based on the touch data of the first touch for selecting the icon. For example, an area of the area where the touch occurs may be reduced along with an increase in the degree of the angle (e.g., finger pitch) (approaching 90 degrees) between the touch input tool and the touch screen display, and the area of the area where the touch occurs may be reduced depending on the degree of rotation (e.g., finger roll) in which the touch input tool is tilted laterally.

According to an embodiment, the size of the area where the touch occurs may be identified depending on the size of the touch input tool. For example, in the case of a finger, the size of the area where the touch occurs may be different depending on the age or gender of the user, such as an adult or a child.

According to an embodiment, the processor 320 may identify the size of the area where the touch occurs based on at least one of a gripping direction of the electronic device, the posture of the electronic device, and usage pattern learning information through a network.

For example, the electronic device 101 may use an artificial intelligence (AI) system to determine the user's pattern (e.g., life pattern, electronic device usage pattern) and provide a personalized service that fits the user's pattern. According to an embodiment, the electronic device may generate user behavior pattern information through the AI system.

According to an embodiment, in operation 775, the processor 320 may reconfigure (or adjust) the position of the floating icon so that the touch point (e.g., touch coordinates) of the area where the touch occurs matches the center point of the floating icon and display the reconfigured position of the floating icon. The processor 320 may control the floating icon to move while the center point of the floating icon matches the coordinates of a touch center of the drag signal.

According to some embodiments, operations 770 and 775 may be performed as preprocessing for icon display before operation 760.

In operation 780, the processor 320 may move the icon according to the movement direction and movement position of the floating icon based on the drag input for the floating icon, and display the reconfigured screen.

For example, by dragging the icon, the user may perform functions such as changing the position of the icon, generating a folder for the icon, or changing a page for the icon, and rearrange and display the screen accordingly.

The processor 320 may identify the drag speed, and dynamically reconfigure the data processing time (e.g., reordering duration) of an animation effect according to the movement of the object depending on the drag speed. For example, when the user's drag speed is fast, the processor 320 may display the animation effect on the screen quickly by reducing the reordering duration according to the drag input. When the drag speed is slow, the processor 320 may increase the reordering duration to display the animation effect on the screen at a speed appropriate for the slow drag speed, thereby providing a user experience effect suitable for the user's intention.

In operation 790, the processor 320 may detect a touch cancellation input, and in operation 795, the processor 320 may change the floating icon to the fixed state by dropping the floating icon at a position where the touch was cancelled, and display the changed result.

Figure 8A:
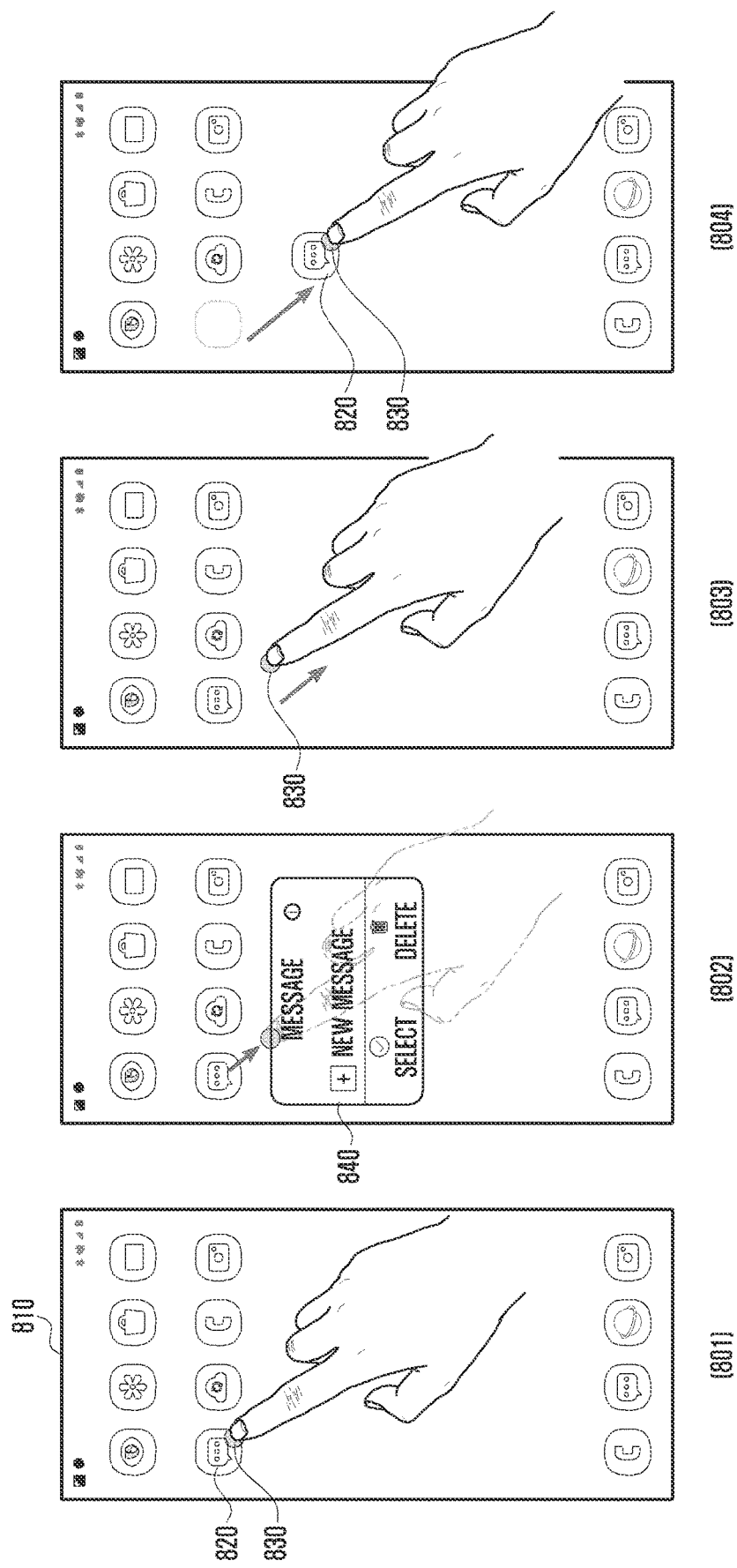
FIG. 8A illustrates a user interface screen showing an object movement operation of an electronic device according to an embodiment of the disclosure.

FIG. 8A illustrates a user interface screen showing an object movement operation of an electronic device according to an embodiment of the disclosure.

Referring to FIG. 8A, according to an embodiment, the display (e.g., the touch screen display 310 of FIG. 3) of the electronic device 101 may display a home screen 810 including a plurality of icons as shown in screen 801.

The user may touch a message app icon 820 and maintain the touch for a predetermined period of time. The processor (e.g., the processor 320 in FIG. 3) may receive a first touch 830 for selecting the message app icon 820, and recognize a long press input when the first touch 830 passes a first touch time T1.

As shown in screen 802, pop-up information 840 of the message app icon 820 may be displayed in response to the long press input for selecting the message app icon 820. For example, the pop-up information 840 may include at least one guidance item that guides the use of other information (e.g., a function execution item that can be changed to generate a new message).

The processor 320 may maintain the message app icon 820 in a fixed state even if the pop-up information 840 is displayed according to the long press input.

As shown in screen 803, the user may drag the first touch 830 to a position outside the messaging app icon 820 while the pop-up information 840 is displayed.

When the drag signal does not deviate from any of the drag movement time T2 and drag movement distance D1 even if the user's drag signal (or touch movement) is received, the processor 320 may maintain the message app icon 820 in a fixed state, thereby preventing unintentional and unnecessary movement of the icon.

When the user's drag signal (or touch movement) or touch cancellation is received, the processor 320 may cancel a display of the pop-up information 840 of the message app icon 820.

As shown in screen 804, when the user's drag signal deviates from two conditions of the drag movement distance D1 and the drag movement time T1, the processor 320 may determine that the user intends to move the icon and start the drag movement of the message app icon 820. The processor 320 may change the message app icon 820 into a floating state when the drag signal deviates from the two conditions, and move the message app icon 820 to a position where the touch signal is currently received and display the moved result.

Figure 8B:
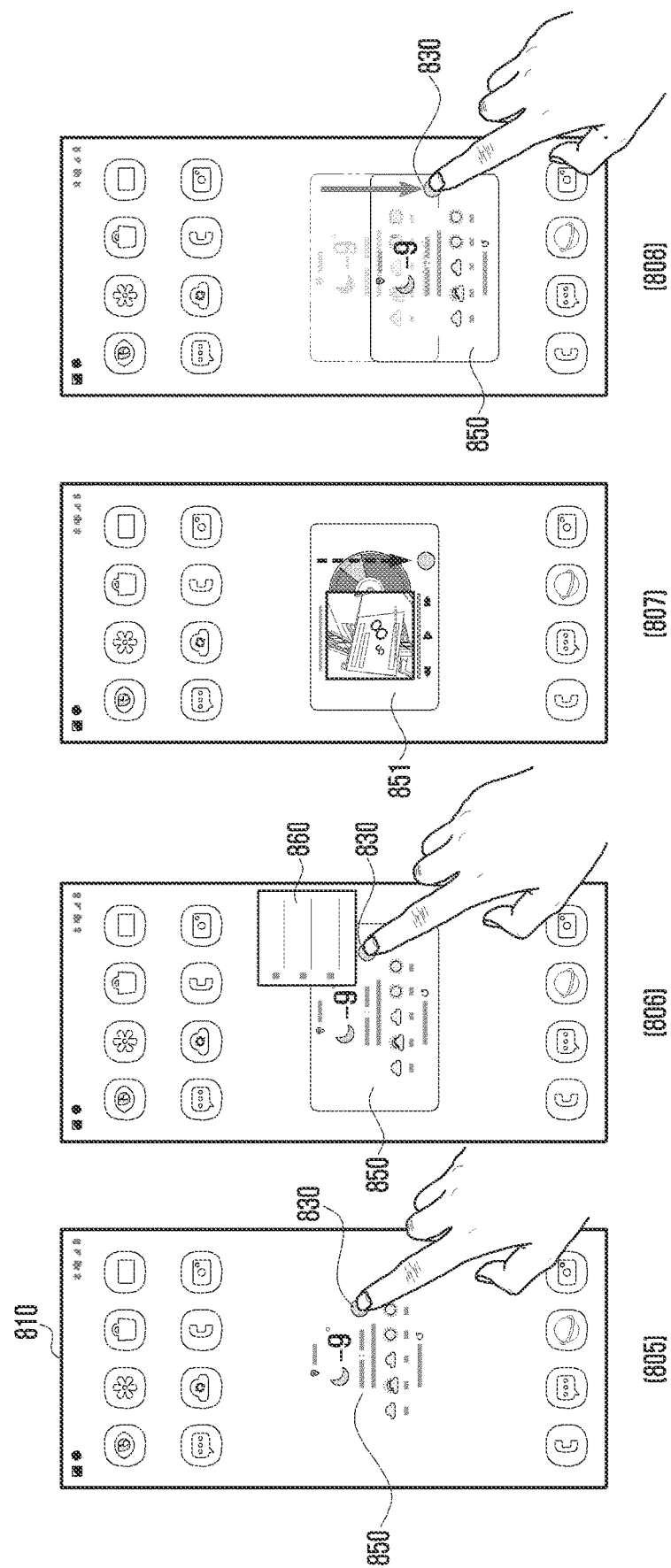
FIG. 8B illustrates a user interface screen showing an object movement operation of an electronic device according to an embodiment of the disclosure.

FIG. 8B illustrates a user interface screen showing an object movement operation of an electronic device according to an embodiment of the disclosure.

Referring to FIG. 8B, according to an embodiment, the display (e.g., the touch screen display 310 of FIG. 3) of the electronic device 101 may display at least one widget (e.g., the weather widget 850) on the home screen 810 as shown in screen 805. The widget is shown as an example of a weather widget 850, but is not limited thereto. The electronic device 101 may support functions of changing widgets, for example, moving, changing, adding, deleting, or combining widgets (e.g., generating a widget stack or widget list).

The processor (e.g., the processor 320 in FIG. 3) may receive a first touch 830 for selecting the weather widget 850, and recognize a long press input when the first touch 830 passes a first touch time T1.

As shown in screen 806, in response to the long press input for selecting the weather widget 850, pop-up information 860 of the weather widget 850 may be displayed. For example, the widget's pop-up information 860 may include menu items (e.g., remove item, edit item) that guide the execution of functions related to the widget.

The processor 320 may maintain the weather widget 850 in a fixed state even if pop-up information 840 is displayed according to the long press input.

According to an embodiment, the processor 320 may display a visual effect (e.g., a border display) to inform that the weather widget 850 has been selected.

For example, the user may perform swiping (e.g., cancellation after touch movement) within a widget area for the swipe function for the weather widget 850, as shown in screen 807. The processor 320 may recognize a swipe input for the widget. The processor 320 may transition a screen for an area where the widget is displayed in response to the swipe input, that is, display another widget (e.g., music play widget 851). For example, the area where the widget is displayed may have a stack structure including a plurality of widgets, and the widgets displayed on the screen may be transitioned in response to the swipe input.

For another example, the user does not perform the swipe input while the pop-up information 840 is displayed on screen 806, but drag the first touch 830 to a position outside the weather widget 850 as shown in screen 808.

When the drag signal does not deviate from any of the drag movement time T2 and the drag movement distance D1 even though the user's drag signal (or touch movement) is received, the processor 320 may maintain the weather widget 850 in the fixed state, thereby preventing unintentional and unnecessary movement.

When the user's drag signal (or touch movement) or a touch cancellation is received, the processor 320 may cancel the display of the pop-up information 860 of the weather widget 850.

When the user's drag signal deviates from both conditions of the drag movement distance D1 and the drag movement time T1 as shown in screen 804, the processor 320 may determine that the user intends to move the widget and start the drag movement of the weather widget 850. When the drag signal deviates from the two conditions, the processor 320 may change the weather widget 850 into the floating state, move the weather widget 850 to a position where the touch signal is currently received, and display the moved weather widget 850.

Figure 9:
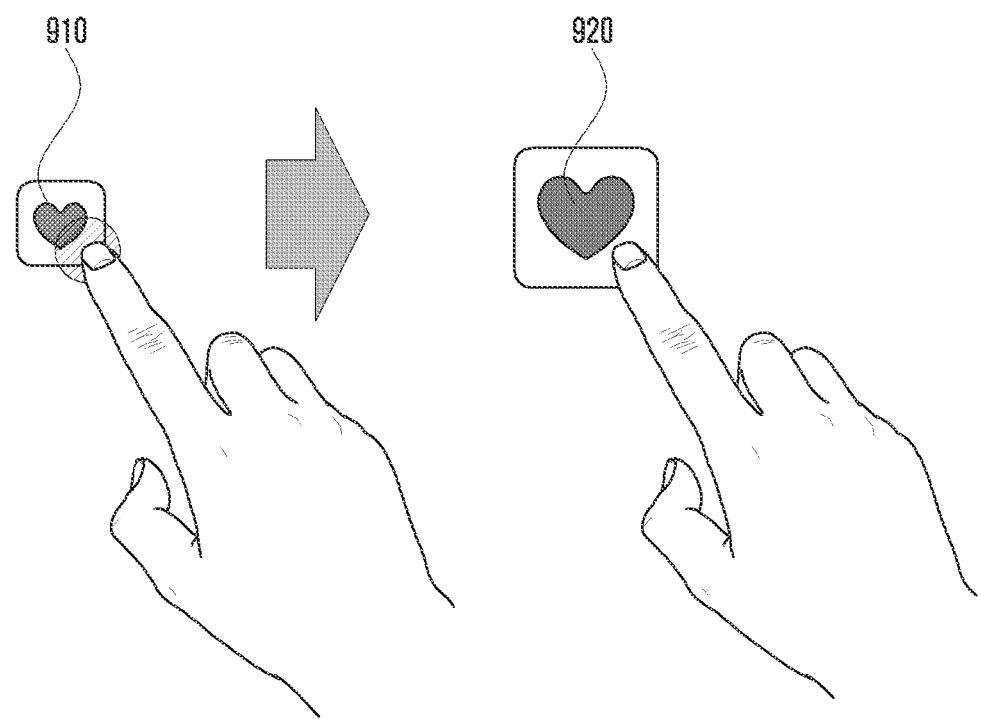
FIG. 9 illustrates a user interface screen showing an object movement operation of an electronic device according to an embodiment of the disclosure.

FIG. 9 illustrates a user interface screen showing an object movement operation of an electronic device according to an embodiment of the disclosure.

Referring to FIG. 9, the electronic device 101 according to an embodiment may support a function of adjusting the size of an object selected according to the size of a touch area.

The electronic device 101 may identify the size of the touch area where an icon 910 is selected, adjust the size of the selected icon 910, change the icon 910 to an icon 920 with the adjusted size, and start an object drag movement. For example, the user may select the app icon 910 with a first size displayed on the touchscreen display using a finger. The electronic device 101 may adjust the app icon from the first size to the second size. The electronic device 101 may display the app icon 920 adjusted to the second size to provide a visual guidance effect for an input intended by the user.

Figure 10:
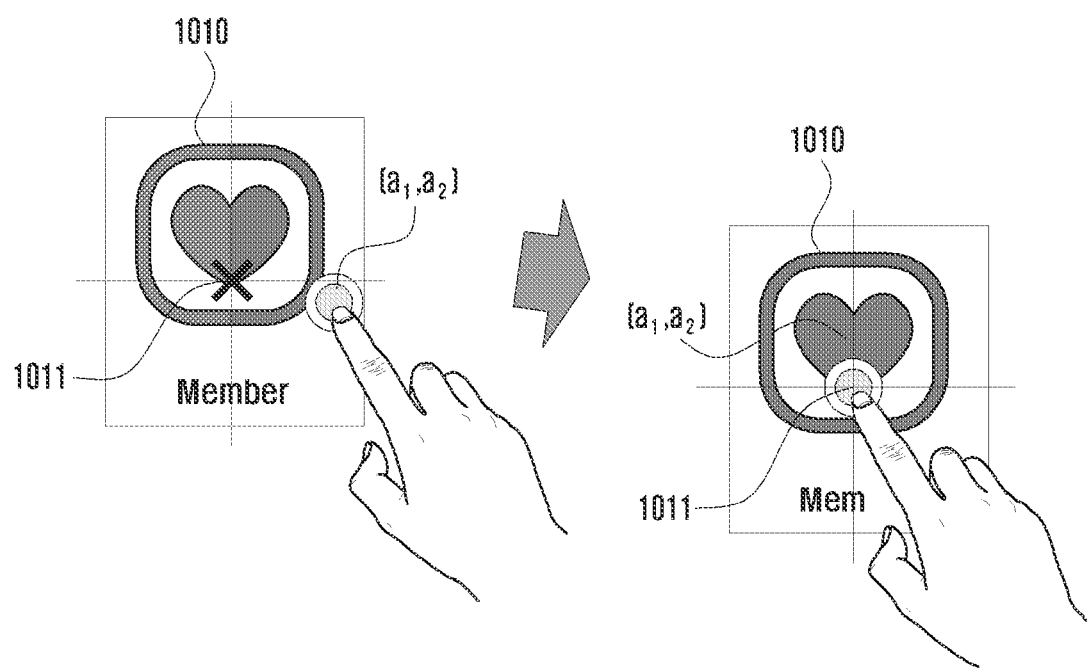
FIG. 10 illustrates a user interface screen showing an object movement operation of an electronic device according to an embodiment of the disclosure.

FIG. 10 illustrates a user interface screen showing an object movement operation of an electronic device according to an embodiment of the disclosure.

Referring to FIG. 10, the electronic device 101 according to an embodiment may support a function of reconfiguring the position of a floating icon so that a touch point (e.g., touch coordinates) of a touch area matches the center point of the floating icon.

For example, an app icon 1010 may be displayed on a grid screen with a grid structure. For example, the app icon 1010 may be displayed in a first grid divided into four compartments. When a touch is received within the first grid, the electronic device 101 may recognize the touch as a touch that selects the app icon 1010.

For example, even if coordinates (a1, a2) are touched rather than the position where the app icon 1010 is displayed, the electronic device 101 may recognize the touch as a touch within the first grid and select the app icon 1010. In this case, when the app icon 1010 is moved according to a drag input, the border of the user's intended input may be unclear.

The electronic device 101 may adjust the position of the app icon 1010 so that the app icon 1010 is moved while a center point 1011 of the app icon 1010 matches coordinates (a1, a2) of the touch center, thereby providing a visual guidance effect for the movement of the icon.

For example, in a case where the electronic device is a foldable device or slidable device that supports multiple pages (or left and right pages), when the center point of the icon and the touched center point do not match, a phenomenon may occur where a drag signal for moving an object at the page border moves to another page contrary to the user's intention. The electronic device 101 may cause the app icon 1010 to be moved while the center point 1011 of the app icon 1010 matches coordinates (a1, a2) of the touch center, so that the app icon 1010 may be placed at a position where the user intends to move the app icon.

According to an embodiment, a method at an electronic device of improving an object movement operation may include receiving, by the electronic device, a first touch for selecting an object displayed on a touch screen display, detecting, by the electronic device, a long press input in response to elapsing of a predetermined first touch time (T1) from the first touch, after the long press input is received, receiving, by the electronic device, a drag signal indicating a move of the first touch in a certain direction, in case that the drag signal does not deviate from any of a predetermined drag movement time (T2) or a drag movement distance (D1), maintaining, by the electronic device, the selected object in a fixed state, and in case that the drag signal deviates from both the predetermined drag movement time (T2) and the drag movement distance (D1), changing, by the electronic device, the object selected by the first touch into a floating state from a time point of the deviation from both the drag movement time (T2) and the predetermined drag movement distance (D1), and performing, by the electronic device, control such that a drag movement of the floating object starts in response to the drag signal.

According to various embodiments, the method may include, after starting the drag movement of the floating object, receiving a touch cancellation signal of the drag signal, dropping the floating object moved to a position where the touch cancellation signal is received, and displaying the dropped floating object on a display in a fixed state.

According to various embodiments, the operation of detecting of the long press input may include displaying pop-up information of the selected object in response to detection of the long press input and controlling the display of the displayed pop-up information to be cancelled in response to reception of the drag signal.

According to various embodiments, the pop-up information of the object is a pop-up window including items guiding a pop-up function or option for identifying other information about the selected object.

According to various embodiments, the operation of performing of the control such that the drag movement of the floating object starts may include controlling a vibration effect notifying the start of the drag to be output at a time of starting of the drag movement of the floating object.

According to various embodiments, the drag movement distance and the predetermined drag movement time are dynamically adjusted based on one of user-specific information analyzed based on usage history of the electronic device and sensor information.

According to various embodiments, the operation of performing of the control such that the drag movement of the floating objects starts may include identifying a size of a touch area based on the first touch, and adjusting a size of the selected object in proportion to the size of the touch area, and wherein at the time of starting of the drag movement of the floating object, the object is displayed as the floating object with the adjusted size.

According to various embodiments, the operation of performing of the control such that the drag movement of the floating objects starts may include identifying a center point of an area where the floating object is displayed and adjusting a position of the floating object so that the floating object is moved while the center point of the floating object matches coordinates of a touch center of the drag signal.

According to various embodiments, the operation of performing of the control such that the drag movement of the floating objects starts may include identifying a speed of the drag signal, and controlling a data processing time of an animation effect according to the movement of the floating object to be variable in response to the speed of the drag signal.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a touch screen display;
   memory; and
   one or more processors communicatively coupled to the touch screen display and the memory,
   wherein the memory stores one or more computer programs including computer-executable instructions that, when executed by the one or more processors, cause the electronic device to perform operations of:
      detecting a long press input in response to elapse of a predetermined touch threshold time from a first touch for selecting an object displayed on the touch screen display,
      after the long press input is received, receiving a drag signal corresponding to a move of the first touch in a certain direction,
      in case that a drag movement time and a drag movement distance included in the drag signal do not exceed any of respective predetermined thresholds, maintaining a selected object in a fixed state, and
      in case that both the drag movement time and the drag movement distance included in the drag signal exceed respective predetermined thresholds:
         identifying a size of a touch area based on the first touch,
         adjusting a size of the selected object in proportion to the size of the touch area to control the object with the adjusted size to be displayed, and
         changing the object selected by the first touch into a floating state from a time point which both the drag movement time and the drag movement distance included in the drag signal exceed respective predetermined thresholds, and
      performing control such that a movement of a floating object starts in response to the drag signal.

2. The electronic device of claim 1, wherein the one or more computer programs further comprise computer-executable instructions to perform operations, in response to reception of a touch cancellation signal of the drag signal:
   controlling to drop the floating object moved to a position where the touch cancellation signal is received; and
   displaying the dropped floating object in a fixed state.

3. The electronic device of claim 1, wherein the object comprises at least one of an app icon, a widget, an image, content, text, a file, or a folder.

4. The electronic device of claim 1, wherein the one or more computer programs further comprise computer-executable instructions to perform operations:
   displaying pop-up information of the selected object in response to detection of the long press input, and
   controlling displaying of the displayed pop-up information to be cancelled in response to reception of the drag signal.

5. The electronic device of claim 4, wherein the pop-up information of the object is a pop-up window including items guiding a pop-up function or option for identifying other information about the selected object.

6. The electronic device of claim 1, wherein the one or more computer programs further comprise computer-executable instructions to perform operations controlling a vibration effect notifying a start of the movement of the floating object to be output at a time of starting of the movement of the floating object.

7. The electronic device of claim 1, wherein the respective predetermined thresholds of the drag movement distance and the drag movement time are dynamically adjusted based on one of user-specific information analyzed based on usage history of the electronic device and sensor information.

8. The electronic device of claim 1, wherein the one or more computer programs further comprise computer-executable instructions to perform operations:

identifying a center point of an area where the floating object is displayed, and adjusting a position of the floating object so that the floating object is moved while the center point of the floating object matches coordinates of a touch center of the drag signal.

9. The electronic device of claim 1, wherein the one or more computer programs further comprise computer-executable instructions to perform operations:

identifying a speed of the drag signal, and controlling a data processing time of an animation effect according to the movement of the floating object to be variable in response to the speed of the drag signal.

10. The electronic device of claim 1, wherein the adjusting of the size of the selected object comprises adjusting an app icon from a first size to a second size, and wherein the app icon adjusted to the second size is displayed to provide a visual guidance effect.

11. A method performed by an electronic device for improving an object movement operation, the method comprising:

receiving, by the electronic device, a first touch for selecting an object displayed on a touch screen display;

detecting, by the electronic device, a long press input in response to elapsing of a predetermined touch threshold time from the first touch;

after the long press input is received, receiving, by the electronic device, a drag signal indicating a move of the first touch in a certain direction;

in case that a drag movement time and a drag movement distance included in the drag signal do not exceed any of respective thresholds, maintaining, by the electronic device, the selected object in a fixed state; and in case that both the drag movement time and the drag movement distance included in the drag signal exceed respective predetermined thresholds:

identifying a size of a touch area based on the first touch, adjusting a size of the selected object in proportion to the size of the touch area to control the object with the adjusted size to be displayed, and changing, by the electronic device, the object selected by the first touch into a floating state from a time point which both the drag movement time and the drag movement distance included in the drag signal exceed respective predetermined thresholds; and performing, by the electronic device, control such that a movement of a floating object starts in response to the drag signal.

12. The method of claim 11, further comprising:

after starting the movement of the floating object, receiving a touch cancellation signal of the drag signal;

dropping the floating object moved to a position where the touch cancellation signal is received; and displaying the dropped floating object on a display in a fixed state.

13. The method of claim 11, wherein the detecting of the long press input comprises:

displaying pop-up information of the selected object in response to detection of the long press input; and controlling the display of the displayed pop-up information to be cancelled in response to reception of the drag signal.

14. The method of claim 11, wherein the performing of the control such that the movement of the floating object starts comprises:

identifying a center point of an area where the floating object is displayed; and adjusting a position of the floating object so that the floating object is moved while the center point of the floating object matches coordinates of a touch center of the drag signal.

15. The method of claim 11, wherein the performing of the control such that the movement of the floating object starts comprises:

identifying a speed of the drag signal, and controlling a data processing time of an animation effect according to the movement of the floating object to be variable in response to the speed of the drag signal.

16. One or more non-transitory computer-readable storage media storing one or more computer programs including computer-executable instructions that, when executed by one or more processors of an electronic device, cause the electronic device to perform operations, the operations comprising:

receiving, by the electronic device, a first touch for selecting an object displayed on a touch screen display;

detecting, by the electronic device, a long press input in response to elapsing of a predetermined touch threshold time from the first touch;

after the long press input is received, receiving, by the electronic device, a drag signal indicating a move of the first touch in a certain direction;

in case that the a drag movement time and a drag movement distance included in drag signal do not exceed any of respective thresholds, maintaining, by the electronic device, the selected object in a fixed state; and in case that both the drag movement time and the drag movement distance included in the drag signal exceed respective predetermined thresholds:

identifying a size of a touch area based on the first touch, adjusting a size of the selected object in proportion to the size of the touch area to control the object with the adjusted size to be displayed, and changing, by the electronic device, the object selected by the first touch into a floating state from a time point which both the drag movement time and the drag movement distance included in the drag signal exceed respective predetermined thresholds; and performing, by the electronic device, control such that a movement of a floating object starts in response to the drag signal.

17. The one or more non-transitory computer-readable storage media of claim 16, wherein the operations further comprising:

after starting the movement of the floating object, receiving a touch cancellation signal of the drag signal;

dropping the floating object moved to a position where the touch cancellation signal is received; and displaying the dropped floating object on a display in a fixed state.

18. The one or more non-transitory computer-readable storage media of claim 16, wherein the detecting of the long press input comprises:

displaying pop-up information of the selected object in response to detection of the long press input; and controlling the display of the displayed pop-up information to be cancelled in response to reception of the drag signal.

* * * * *